Aug. 30, 1932.  E. M. TINGLEY  1,874,142
RELAY PROTECTIVE SYSTEM
Filed Dec. 12, 1928
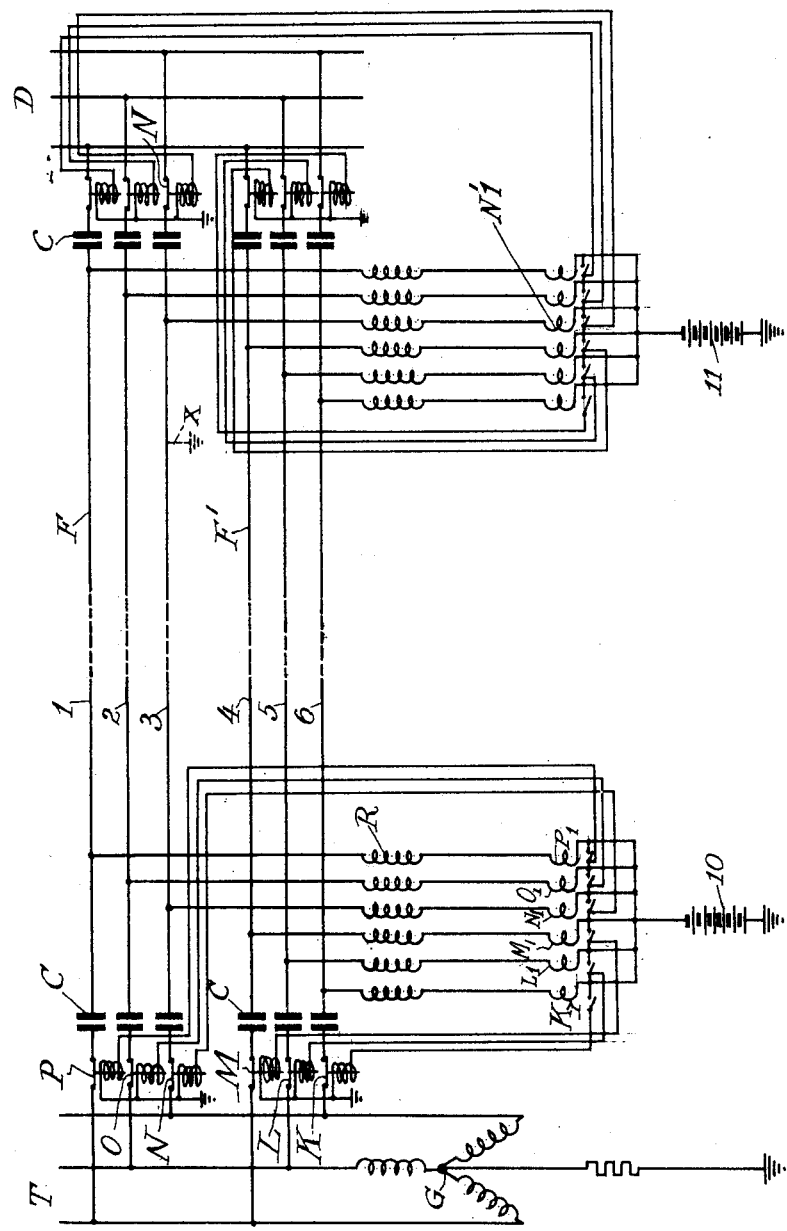
Inventor
Egbert M. Tingley
By [signature] Atty's Patented Aug. 30, 1932

1,874,142

UNITED STATES PATENT OFFICE

EGBERT M. TINGLEY, OF OAK PARK, ILLINOIS

RELAY PROTECTIVE SYSTEM

Application filed December 12, 1928. Serial No. 325,457.

This invention appertains to protective systems for transmission lines and it is a particular object of this invention to provide a protective system for protecting high voltage alternating current transmission lines or cables against ground faults, and further to provide a system wherein a ground on one line may be quickly discovered and the faulty line isolated from the rest of the system. While this invention is particularly concerned with power systems, it is not limited thereto, and is equally applicable to communicating systems, and further it may be applied to isolate any electrical apparatus other than a transmission line upon the occurrence of a ground fault in the apparatus.

Alternating current power transmission lines are frequently connected to power distribution lines by means of one or more feeders. Should a feeder become grounded, it is necessary to disconnect it from both the transmission line and the distribution line. It is an object of this invention to provide such protection, this being accomplished in the form of invention here illustrated by applying grounded direct potential to both ends of the feeder so that a ground connection along the feeder will complete the circuit from both sources of potential. A relay is included in each of the direct current circuits which relay, when energized, closes a circuit for the tripping coil of the feeder circuit breaker thus disconnecting the feeder from the line. In order to prevent the flow of direct current through the feeder to the transmission line or to the distribution line the feeder is connected to those lines through power condensers. The condensers are of large capacity and offer practically no obstruction to the alternating current flowing over the feeder. The condensers confine the direct current to the feeder and it is, therefore, possible to use a very small source of direct current to control the switches to disconnect the feeder upon the occurrence of a ground fault. The condensers also tend to improve the power factor of the system since most loads have a lagging power factor.

It is to be further noted that the operation of this system is independent of the amount of alternating current being transmitted over the feeder.

The single figure of the drawing is a diagrammatic representation of the circuit embodying my invention.

In the drawing, the alternating current generator G supplies the voltage to the transmission line T, which is connected by means of feeders F and F' to the distribution line D. While I have here shown the invention as applied to a three phase system, it is, of course, understood that the invention is equally applicable to a single phase system, or to a system of any number of phases. The feeder F comprises the lines 1, 2, and 3, the lines being connected to the transmission system by means of switches M, O, and P, respectively, and capacitors C. The capacitors C are simply large power condensers. The trip coils of the switches N, O, and P, are represented at N1, O1 and P1, respectively. The coil N1, O1 and P1, respectively, may be either the trip coils of the respective electromagnetic switches N, O, P or may be coils for auxiliary relays to control the respective switches N, O, P. The coils are connected to the respective lines of the feeders F and F' through the blocking reactors R which effectively prevent the flow of alternating current through the coils.

The feeder F' is similar to the feeder F and is provided with similar switches K, L, and M controlled by the coils K1, L1, and M1, respectively. The end of the feeder adjacent the distribution line is similar to the end adjacent the transmission line.

When the line is operating under normal conditions, no current flows through the switch operating coils from the batteries 10 and 11. In case of a fault to ground occurring at some point X, current will flow from the grounded battery 10, through a trip coil such as N1 and the corresponding reactor R, through the line 3 to ground at X. The trip coil N1 causes the opening of the switch N thereby disconnecting the line 3 from the transmission system. A similar circuit is completed from the battery 11 through the trip coil N'1, thus tripping the switch N' to disconnect the faulty conductor from the distribution system. The line 3 is thereby completely isolated from the power system whereas the lines 1, 2, 4, 5 and 6 remain connected. The line 6 will now carry the load previously carried by the line 3 until such time as the fault is cleared.

It is apparent from the description thus far given that a fault on any one of the other lines of either of the feeders will cause corresponding isolation of that line.

While I have here shown my invention as applied to a feeder in a power distribution system it is not limited to such application. For example, the line such as 1 might be a buss bar, or a transformer, instead of a feeder.

In compliance with the requirements of the patent statutes, I have herein shown a preferred embodiment of my invention. I do not, however, wish to be limited to the precise embodiment shown, the same being merely illustrative of the invention. What I consider new, and desire to secure by Letters Patent is:

1. In an electric system, two power lines, a plurality of parallel feeders capacitively coupled to both of said lines for transferring power from one to the other line, switches for connecting and disconnecting the ends of each feeder to the respective lines, means at each end of the feeders for impressing a grounded source of direct potential on the respective feeders over separate circuits, each circuit including means for opening the switch at that end of the particular feeder responsive to the completion of the direct current circuit upon the occurrence of a ground on that feeder.

2. In an alternating current system, wherein two power lines are interconnected by a feeder which is capactively coupled to both lines for transferring power between the lines, means for isolating the feeder from both lines responsive to the occurrence of a ground on the feeder, said means comprising a pair of electric switches at the two ends of the feeder and circuits for controlling said switches, each of said circuits including a source of direct current connected to the feeder and each circuit being completed upon the occurrence of a ground on the feeder.

3. In an alternating current system, wherein two power lines are interconnected by a feeder which is capacitively coupled to both lines for transferring power between the lines, means for isolating the feeder from both lines responsive to the occurrence of a ground on the feeder, said means comprising a pair of electric switches at the two ends of the feeder and circuits for controlling said switches, each of said circuits including a source of direct current, each circuit being connected to the feeder and completed upon the ocurrence of a ground on the feeder, and means in each circuit for blocking the alternating current of the line from flowing through the sources of direct current.

4. In combination, two power lines, a feeder insulated therefrom, coupling means coupling the feeder to both lines for transferring power between the lines, electro-responsive means and a grounded source of direct current potential connected to each end of the feeder, the potentials at the two ends of the feeder being equal and opposing one another whereby no current from said sources flows over the portion of the feeder between said sources during the normal operation of the system, said coupling means obstructing the flow of direct current from said sources of potential to the lines, a circuit including said sources of potential and said electro responsive means completed upon the occurrence of a ground on the feeder, and means controlled by said electro responsive means for isolating said feeder from said lines upon the completion of said circuit.

5. In an electric power system, a link forming a portion of a circuit, capacity power couplings between each end of the link and the rest of the circuit, all of the power transferred between the link and the rest of the circuit passing through the capacity couplings and means for disconnecting each end of the link from the circuit, said means including a source of voltage at each end of the link, said voltage being of characteristics such that practically no current from said sources can pass through the couplings, the voltages impressed and at the two ends of the feeder being equal and opposing one another whereby no current flows from said sources over the portion of the feeder between the sources during the normal operation of the system, and switching means at each end of the link controlled from the respective sources of potential responsive to the flow of current therefrom upon the occurrence of a ground fault on said link.

6. In combination, electric current conducting means, a switching device and a capacitive coupling at each end of said means for connecting said means in an electric circuit, all of the energy transferred to the conducting means being transferred through the capacity couplings, means for impressing a potential on said first means of characteristics substantially impassable through the capacity couplings, and a tripping coil for each switching device, said tripping coils being controlled by current from said last mentioned potential to open the switching devices upon the occurrence of a ground fault on said first means.

7. In an electric power system a link connected in series in said system, said connection including a condenser in series therewith, and a means including a source of direct current connected to said link for controlling the disconnection of the link from the system.

8. In an alternating current power system, the combination with a section of an alternating current power line, capacity couplings between said section and the rest of the system for permitting the passage of alternating current to and from the section, said couplings preventing the passage of direct current from the section, switching means for disconnecting one end of the section from the rest of the system, a grounded source of direct current potential connected to said section, there being normally no flow of direct current from said source to said section, a circuit from said source through said section being completed upon the occurrence of ground fault on said section, the return being by way of the earth, and means responsive to the flow of direct current from said source for opening the switching means for disconnecting the end of the section from the rest of the system.

9. In an alternating current power system, combination with a section of an alternating current power line, capacity couplings at the ends of the section for permitting the passage of alternating current to and from the section, said couplings preventing the passage of direct current from the section, switching means at the ends of the section for isolating the section, grounded sources of direct current potential connected to the opposite ends of the section, the potentials impressed being in opposition and of equal values whereby, during normal operation, no direct current flows through the loop including the sources of potential, the section of the line and the ground return, and upon the occurrence of a ground fault direct current flows from said sources of potential to the ground fault, and means at each end of the section and responsive to the flow of current from the respective sources of potential for operating the switching means at the corresponding end of the section to isolate the section from the rest of the system.

10. In an alternating power system the combination with a section of an alternating current power line, a capacity coupling between the section and the rest of the line, said coupling constituting an open circuit for direct current, a special source of potential connected to the section of the line, the potential being of the kind that currents produced thereby are substantially impassable through the capacity coupling, means responsive to the occurrence of a ground fault on the section of the line for completing a circuit from said source of potential, and means responsive to the completion of said circuit for protecting the system against said fault.

In witness whereof, I hereunto subscribe my name this 4th day of December, 1928.

EGBERT M. TINGLEY.